Nov. 9, 1943. A. E. MATHEY Re. 22,391

LIQUID LEVEL INDICATOR

Original Filed March 31. 1936

Witness

Paul F. Bryant

Inventor

Alcide E. Mathey
by his Attorneys
Fish Hildreth Carey & Dunway

Reissued Nov. 9, 1943 Re. 22,391

UNITED STATES PATENT OFFICE 22,391

LIQUID LEVEL INDICATOR

Alcide E. Mathey, Boston, Mass., assignor to Scully Signal Company, Cambridge, Mass., a corporation of Massachusetts Original No. 2,135,522, dated November 8, 1938, Serial No. 71,870, March 31, 1936. Application for reissue October 25, 1940, Serial No. 362,881

16 Claims. (Cl. 137—111)

Figures 1, 2:
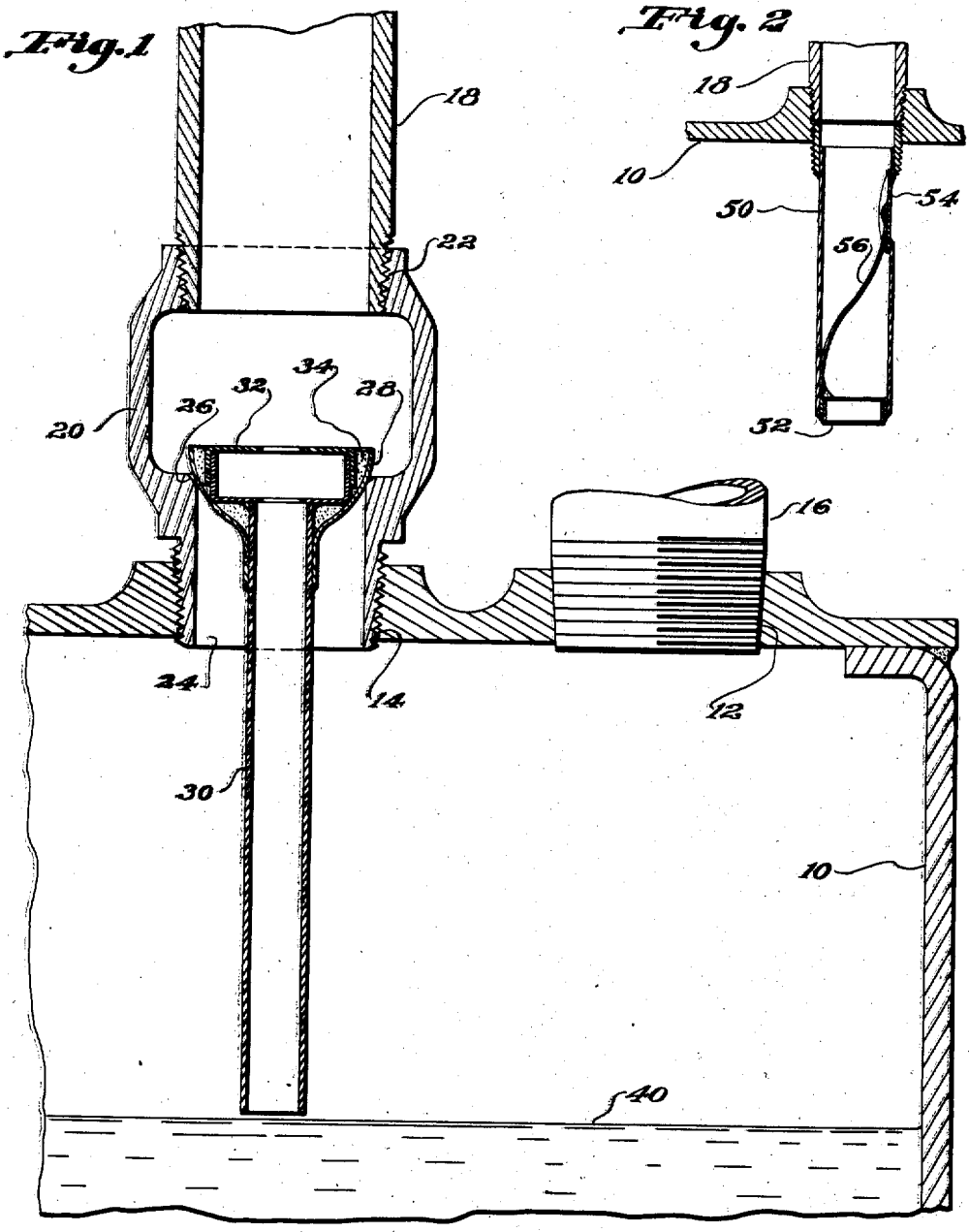

The present invention relates to signal devices, and is more particularly concerned with devices of this character designed for indicating the liquid level in a fuel tank or the like, normally closed except for the provision of filling and vent openings.

The purpose of the invention is to provide an audible signal for such a tank which shall be continuously operable until the liquid level has reached a predetermined point and which will thereafter cease to function.

With this and other objects in view, the various features of the invention consist in certain novel features of construction, combinations and arrangements of parts hereinafter described and claimed, the advantages of which will be obvious to those skilled in the art from the following description.

In the accompanying drawing, Fig. 1 represents a section in elevation of a conventional tank equipped with the improved form of audible signalling device; and Fig. 2 illustrates a modified form of the same type of device.

Referring particularly to the illustrated embodiment of the invention, a closed fuel tank indicated generally at 10 is provided with a filling opening 12 and a vent opening 14. The filling opening may have threaded thereinto the usual filler pipe 16, and the vent opening is connected with a vent extension 18. This type of tank is commonly employed for the reception of fuel oil and the like employed for household purposes. The tank is normally located in the cellar of the house or building, and the filling and vent pipes extend outwardly to atmosphere. It is desirable to provide simple and efficient means, inasmuch as the tank is not readily observable, by virtue of which the attainment of a predetermined level in the tank may be determined by the operator from the outside. According to the present invention this is accomplished through the provision of an audible signal device which is continuously operable as level rises until the latter reaches a point predetermined by the extension of a pipe or tube into the tank. Thereafter the audible signal is stilled by trapping of the lower end of the tube through the rising liquid level. The increased pressure due to continued filling of the tank is conveniently vented by a relief valve operable upon pressure exceeding predetermined limits.

In the illustrated embodiment of the invention, the usual vent pipe is disconnected from the vent opening 14, and a casing 20 is threaded thereinto at its lower end and connected with the vent pipe at 22. This casing has a vent opening 24 of ample size for the requirements of the tank and may be provided with a seat 26 which is normally engaged by a generally spherical valve member 28. This spherical valve member is connected to a dependent tube 30 which projects downwardly into the tank a predetermined distance, the valve 28 supporting the tube in predetermined position during normal operation. The upper end of the tube is connected with a whistle 32, which, as shown, is located within the valve 28. If desired, the space 34 between the whistle and valve may be filled with solder to impart greater weight to the assembly and aid in the retention of the valve on its seat.

In the ordinary operation of the device, as liquid is caused to enter the tank through the filler pipe 16 the gas and/or vapor under pressure is driven out through the tube 30 and thence through the whistle 32, creating a constant audible alarm. This continues until the liquid level indicated at 40 has risen to a point where the lower end of the tube 30 is trapped. Thereafter further escape of vapors from the upper portion of the tank through the tube 30 is prevented and the whistle ceases.

During the preliminary filling up to the given level the valve 28 normally rests upon the seat and causes substantially all of the vapor to pass through the whistle or signal device. If the pressure due to rapid filling, however, exceeds a predetermined amount, the entire tube assembly will be elevated from its seat and permit some of the vapors to be bypassed about the signal device. If after trapping of the lower end of the tube the filling is also continued the upper portion of the tank may be also vented in this same manner by elevation of the assembly from its seat. It will thus be seen that the relief valve serves the dual function of venting against excessive pressure until the predetermined level is reached, and thereafter relieving pressure if continued filling of the upper part of the tank is carried on. It will be also observed that as this type of tank is more frequently than not round or oval in cross-section, the location of the vent is not always such that the pendant tube will hang vertically, and the employment of the generally spherical valve permits the tube to assume a natural position without the necessity of guides or other means, and insures the operation of the signal device and the operation of the relief vent without danger of the valve binding or otherwise becoming constricted or failing to properly seat.

In the modification illustrated in Fig. 2, the mode of operation is identically the same, although the actual construction is somewhat different. Referring particularly to this figure, a vent pipe 50 is threaded into the vent opening of the tank and is provided with a whistle 52 at the lower end. The wall of the vent pipe at a point substantially above the lower end has a relief valve 54 normally maintained closed by a light spring 56. With this structure, as will be evident, audible signal is created until the lower end of the projecting pipe and the whistle are trapped, and thereafter if excessive pressure is created above the level, this may be vented by opening of the valve 54 disposed above the point at which air or vapors are normally trapped.

I claim:

1. The combination in a closed tank having filling and vent openings, of a liquid level indicator comprising a vent tube in the vent opening and of smaller diameter and projecting downwardly into the tank with its lower end designed to be trapped by rising liquid level, an audible signal communicating with the tube, and means associated with the tube for normally sealing the vent opening thereabout designed to be elevated to relieve the space thereabout when the pressure exceeds a predetermined amount.

2. The combination in a closed tank having filling and vent openings, of a liquid level indicator comprising a casing connected with the vent opening having a valve seat, a tube smaller than the vent opening projecting downwardly into the tank, a valve connected with the tube and normally resting on the seat to support the tube thereby, and an audible signal connected to the tube actuated by the flow of gas or vapor therethrough.

3. The combination in a closed tank having filling and vent openings, of a liquid level indicator comprising a casing connected with the vent opening having a valve seat, a tube smaller than the vent opening projecting downwardly into the tank, a generally spherical valve connected to the tube and supporting the latter upon the valve seat with freedom for angular movement, and an audible signal connected with the tube designed to be actuated by flow of gas or vapor therethrough.

4. The combination in a closed tank having filling and vent openings, of a liquid level indicator comprising a tube projecting downwardly from the vent opening, an audible signal in communication with the tube and designed to be continuously actuated until the lower end of the tube is trapped by rising liquid level, and relief means located above the lower end of the tube and designed to independently permit the escape of gases and vapor when the rising liquid level has trapped the lower end of the tube.

5. In combination with a closed tank for the reception of fluid, a supply conduit leading into the tank, and a combined signal and vent device comprising an open ended casing fixed in an opening in the upper part of the tank, an open tube mounted within the casing with its lower end at a predetermined distance below the upper end of the casing, a fluid actuated signal device so associated with the tube as to be sounded by gaseous fluid passing through the tube, the passage through the tube and the signal device being of sufficient capacity to vent the tank under normal filling conditions without unduly increasing the pressure in the tank, the cross-sectional area of the passage outside the tube (within the casing) being at least as great as the minimum vent area required by law, and a valve device normally closing said latter passage but being arranged to open in response to abnormal pressure within the tank.

6. In combination with a closed tank for the reception of fluid, a supply conduit leading into the tank, and a combined signal and vent device comprising a casing fixed in an opening in the upper portion of the tank, said casing having therethrough a vent passage of large capacity open at one end into the interior of the tank and open at its other end externally of the tank, a valve normally closing said passage, said valve being constructed and arranged automatically to open and vent the tank in response to abnormal pressure within the tank, means providing a second vent passage of smaller capacity having an entrance adapted to be trapped by the liquid when the level thereof rises to a predetermined height, and an audible signal arranged to be sounded by gaseous fluid escaping through said smaller vent passage, the smaller vent passage and audible signal being of such capacity as to vent the tank under normal filling conditions without unduly increasing the pressure in the tank.

7. The combination with a closed fluid tank, of a casing connected into an opening in the tank, the casing having a vent passage provided with an annular seat, a vent tube of substantially smaller diameter than the vent passage supported in the casing and projecting downwardly a predetermined distance into the tank, an audible signal connected with the vent tube, a valve normally contacting the annular seat of the vent passage about the tube to compel escape of air and gases through the vent tube, the valve designed to be lifted from its seat under pressure and vent air or gas through the separate annular portion of the vent passage upon rise of pressure in the tank due to trapping of the lower end of the tube or insufficient venting capacity therethrough.

8. The combination with a closed fluid tank, of a supply conduit leading into the tank, a vent tube leading out of the tank with its inner open end at a predetermined distance below the top of the tank, and audible signal device communicating with the vent tube and designed to be continuously actuated by the escape of gas or vapor therethrough until the inner open end of the tube is trapped by rising liquid level, and an automatically operable independent vent from the tank above the inner end of the vent tube normally operable to cause venting through the tube and audible signal until rising liquid level traps the end of the tube, and thereafter with rising liquid level operable to permit continued venting and relief of excessive pressure.

9. A liquid level indicator, for use with a tank having a liquid filling opening and a vent opening, comprising a casing adapted to fit said vent opening, said casing having two passages for the escape of gaseous fluid from the tank, one of said passages being normally open and adapted to be closed when the liquid level rises to a predetermined height, signaling means included as an integral part of said normally open passage so that gaseous fluid passing therethrough will be confined by said passage and signaling means until it has passed beyond said passage and signaling means, said signaling means operable by the displaced gaseous fluid passing through said passage and signaling means, the size of said normally open passage and signaling means being such that the pressures created during all normal rates of filling will be sufficient to operate said signaling means, the other of said passages bypassing said signaling means and including yieldable means normally closing said other passage, the size of said other passage being such that, through the higher portion of the range of normal filling rates, said yieldable means will operate to limit to a substantially predetermined value the pressure of the displaced gaseous fluid passing therethrough.

10. A liquid level indicator, for use with a tank having a liquid filling opening and a vent opening, comprising a casing adapted to fit said vent opening, said casing having two passages of unequal size for the escape of gaseous fluid from the tank, the smaller of said passages being normally open and adapted to be closed when the liquid level rises to a predetermined height, signaling means included as an integral part of said normally open passage so that gaseous fluid passing therethrough will be confined by said passage and signaling means until it has passed beyond said passage and signaling means, said signaling means operable by the displaced gaseous fluid passing through said passage and signaling means, the size of the smaller passage and signaling means being such that the pressures created during all normal rates of filling will be sufficient to operate said signaling means, the other of said passages bypassing said signaling means and including yieldable means normally closing said other passage, the size of said other passage being such that, through the higher portion of the range of normal filling rates, said yieldable means will operate to limit to a predetermined value the pressure of the displaced gaseous fluid passing therethrough, said normally open passage terminating within the confines of said casing.

11. A liquid level indicator, for use with a tank having a filling opening and a vent opening, comprising a casing adapted to fit said vent opening having two passages for the escape of gaseous fluid from the tank, one of said passages having a normally open entrance adapted to be closed by immersion in the liquid in the tank when the level thereof reaches a predetermined height and having its exit below the top of said casing, signaling means operable by the gaseous fluid escaping through said passage, the entrance to the other passage being located above the level of principal gas admission to the signaling device and designed to permit independently the escape of gas regardless of the condition of flow of gas through the first passage, and yieldable means normally closing said other passage adapted to be opened by pressure of said gaseous fluid exceeding a predetermined degree, said other passage bypassing said signaling means.

12. A liquid level indicator, for use with a tank having a filling opening and a vent opening, comprising a casing adapted to fit said vent opening having two passages for the escape of gaseous fluid from the tank, one of said passages being a tube having a normally open entrance adapted to be closed when the liquid rises to a predetermined height, signaling means operable by the gaseous fluid flowing through said tube, and yieldable means normally closing the second passage adapted to be opened by pressure of said gaseous fluid exceeding a predetermined amount, said second passage bypassing said signaling means.

13. A liquid level indicator, for use with a tank having a filling opening and a vent opening, comprising a casing adapted to fit said vent opening having two passages for the escape of gaseous fluid from the tank, one of said passages being a tube having a normally open entrance adapted to be closed upon immersion in the liquid when the level thereof reaches a predetermined height, signaling means in series with said tube and located below the discharge end of said casing, said signaling means operable by the gaseous fluid flowing through said tube, a gravity operated valve normally closing said second passage and responsive to pressure in excess of a predetermined degree to increase the gas flow capacity of the second passage, said two passages merging at the discharge end of the casing and beyond said signaling means.

14. A liquid level indicator, for use with a tank having a filling opening and a vent opening, comprising a casing adapted to fit said vent opening provided with a tube having a normally open entrance adapted to be closed by immersion in the liquid in the tank when the level thereof reaches a predetermined height, a gas operated signaling device in said tube, an opening in said tube bypassing said signaling device, a valve normally restricting said opening but operable under conditions of pressure in excess of a predetermined degree to increase the gas flow capacity of said opening, whereby gas flowing through said opening into said tube may merge with the gas that has passed through said signaling device.

15. A liquid level indicator, for use with a tank having a filling opening and a vent opening, comprising a casing adapted to fit said opening and provided at its lower end with a valve seat, a tube having a valve section engaging said valve seat and provided with signaling means adapted to be actuated by the flow of gas through said tube and to be rendered inoperative by closure of the entrance to said tube by immersion in the liquid in the tank when the level thereof reaches a predetermined height, said valve b ing responsive to pressure in excess of a predetermined degree.

16. A liquid level indicator, for use with a tank having a filling opening and a vent opening, comprising a casing adapted to fit said opening and provided with a valve seat, a tube smaller than the opening in said valve seat projecting therethrough adapted to be closed upon immersion in the liquid in the tank when the level thereof reaches a predetermined height, a generally spherical valve connected to said tube and supporting the latter upon the valve seat for freedom of angular movement, and an audible signal connected with the tube designed to be actuated by flow of gas or vapor therethrough, said valve being responsive to pressure in excess of a predetermined degree.

ALCIDE E. MATHEY.